(12) United States Patent
Wang et al.

(10) Patent No.: US 11,827,091 B2
(45) Date of Patent: Nov. 28, 2023

(54) VEHICLE TRANSMISSION APPARATUS AND VEHICLE

(71) Applicant: BYD COMPANY LIMITED, Guangdong (CN)

(72) Inventors: Fengchun Wang, Shenzhen (CN); Yu Hua, Shenzhen (CN); Anxin Wang, Shenzhen (CN); Tingyu Tang, Shenzhen (CN); Jing Liu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 266 days.

(21) Appl. No.: 17/257,151

(22) PCT Filed: Jul. 3, 2019

(86) PCT No.: PCT/CN2019/094549
§ 371 (c)(1),
(2) Date: Dec. 30, 2020

(87) PCT Pub. No.: WO2020/007318
PCT Pub. Date: Jan. 9, 2020

(65) Prior Publication Data
US 2021/0362590 A1 Nov. 25, 2021

(30) Foreign Application Priority Data
Jul. 4, 2018 (CN) .......................... 201810726590.4

(51) Int. Cl.
*B60K 17/04* (2006.01)
*B60K 7/00* (2006.01)
(Continued)

(52) U.S. Cl.
CPC .......... *B60K 17/046* (2013.01); *B60K 7/0007* (2013.01); *F16H 1/32* (2013.01);
(Continued)

(58) Field of Classification Search
CPC ...... B60K 7/00–2007/0092; F16H 1/32; F16H 57/02; F16H 2001/327; B60B 35/122; B60B 35/125
See application file for complete search history.

(56) References Cited

U.S. PATENT DOCUMENTS 6,035,956 A 3/2000 Maurer et al.
6,139,464 A * 10/2000 Roske .................. B60K 7/0007
180/65.6
(Continued)

FOREIGN PATENT DOCUMENTS

CN 1495060 A 5/2004
CN 101220856 A 7/2008
(Continued)

OTHER PUBLICATIONS

International Search Report from PCT/CN2019/094549 dated Sep. 27, 2019 (2 pages).

*Primary Examiner* — Sherry L Estremsky
(74) *Attorney, Agent, or Firm* — CALFEE HALTER & GRISWOLD LLP

(57) ABSTRACT

A vehicle transmission apparatus and a vehicle are provided in this application. The vehicle transmission apparatus includes a motor and a speed reducer. The speed reducer includes a speed reduction gear set. The speed reduction gear set includes an input gear, an intermediate gear, and an output gear. The input gear is connected to the motor. At least one intermediate gear is provided, and is meshed between the input gear and the output gear. Rotational centers of the input gear, the intermediate gear, and the output gear are not on the same line.

20 Claims, 2 Drawing Sheets

(51) Int. Cl.
*F16H 1/32* (2006.01)
*F16H 57/02* (2012.01)

(52) U.S. Cl.
CPC ...... *F16H 57/02* (2013.01); *B60K 2007/0038* (2013.01); *F16H 2001/327* (2013.01)

(56) References Cited

U.S. PATENT DOCUMENTS

| | | | |
|---|---|---|---|
| 6,722,459 B1 * | 4/2004 | Wendl | B60L 15/2054 180/65.51 |
| 7,530,416 B2 * | 5/2009 | Suzuki | F16H 1/46 180/65.6 |
| 2014/0349801 A1 * | 11/2014 | Brenner | H02K 7/116 475/331 |

FOREIGN PATENT DOCUMENTS

| | | | | |
|---|---|---|---|---|
| CN | 101247968 A * | 8/2008 | | B60K 17/043 |
| CN | 101663504 A | 3/2010 | | |
| CN | 102139629 A | 8/2011 | | |
| CN | 103118891 A | 5/2013 | | |
| CN | 103958938 A | 7/2014 | | |
| CN | 104908579 A | 9/2015 | | |
| CN | 105109351 A | 12/2015 | | |
| CN | 206589668 U | 10/2017 | | |
| CN | 207449625 A | 6/2018 | | |
| CN | 109177726 A | 1/2019 | | |
| DE | 19852663 A1 * | 5/2000 | | B60K 17/043 |
| DE | 19852663 A1 | 5/2000 | | |
| DE | 10334546 A1 * | 3/2004 | | B60K 17/02 |
| DE | 102005017722 A1 | 1/2007 | | |
| DE | 102015102746 A1 * | 9/2016 | | |
| EP | 2127934 A1 * | 12/2009 | | B60K 17/046 |
| GB | 2080747 B | 6/1985 | | |
| JP | 2007022386 A | 2/2007 | | |
| WO | WO9728980 * | 8/1997 | | |
| WO | 2012055527 A1 | 5/2012 | | |
| WO | WO-2013119047 A1 * | 8/2013 | | B60K 17/046 |
| WO | 2015135970 A1 | 9/2015 | | |

* cited by examiner

VEHICLE TRANSMISSION APPARATUS AND VEHICLE

CROSS-REFERENCE TO RELATED APPLICATIONS

This application is the National Phase of International Application No. PCT/CN2019/094549, filed on Jul. 3, 2019, which is based on and claims priority to Chinese Patent Application No. 201810726590.4, entitled "VEHICLE TRANSMISSION APPARATUS AND VEHICLE" and filed by BYD Co., Ltd. on Jul. 4, 2018. The contents of the above-referenced applications are incorporated herein by reference in its entirety.

FIELD

This application relates to the field of vehicles, and in particular, to a vehicle transmission apparatus and a vehicle having the same.

BACKGROUND

In the related art, the existing vehicle transmission apparatus is formed by a motor, an input shaft, a speed reducer, an output shaft, a planetary speed reducer, a brake, and a hub. The speed reducer includes an input gear, an intermediate shaft, a primary driven gear, a secondary driven gear, and an output gear. The planetary speed reducer includes a sun gear, a planetary gear, a planetary carrier, and a ring gear.

In addition, the motor is connected to the input shaft. Power is inputted through the input shaft. The input gear is connected to the input shaft, and rotates with the input shaft at the same rotational speed. The input gear is meshed with the primary driven gear. The intermediate shaft is fixed to a speed reducer casing through a bearing. The primary driven gear and the secondary driven gear are connected to the intermediate shaft. The secondary driven gear is connected to an output gear. The output gear and the sun gear are connected to an output shaft. The sun gear is meshed with the planetary gear. The planetary gear is meshed with the ring gear. The ring gear is fixed. The planetary gear is connected to the planetary carrier. The planetary carrier is connected to the hub. The brake is connected to the hub. The vehicle transmission apparatus implements double speed reduction and torque increasing by using the speed reducer and the planetary speed reducer to satisfy the power performance of an entire vehicle.

The speed reducer uses two sets of separate two-stage speed reduction transmission gears, resulting in a relatively large axial size of the speed reducer. This is disadvantageous to widen an aisle of a passenger car. In addition, the vehicle transmission apparatus has a complex structure and poor operating reliability. Further, a specific power transmission route is as follows: the driving motor, the input shaft, the input gear, the primary driven gear, the intermediate shaft, the secondary driven gear, the output gear, the output shaft, the sun gear, the planetary gear, the planetary carrier, and the hub, resulting in low transmission efficiency.

SUMMARY

This application aims to resolve at least one of the technical problems existing in the related art. Therefore, an objective of this application is to provide a vehicle transmission apparatus. The structure of the vehicle transmission apparatus is more compact, which helps widen an aisle of a vehicle.

This application further provides a vehicle.

The vehicle transmission apparatus according to this application includes a motor and a speed reducer, where the speed reducer includes a speed reduction gear set, the speed reduction gear set includes an input gear, an intermediate gear, and an output gear, the input gear is connected to the motor, and at least one intermediate gear is provided and is meshed between the input gear and the output gear; and rotational centers of the input gear, the intermediate gear, and the output gear are not on the same straight line.

In the vehicle transmission apparatus according to this application, through the cooperation of the motor and the speed reducer, the structure of the vehicle transmission apparatus becomes more compact, which helps widen an aisle of a vehicle. Moreover, the structure of the vehicle transmission apparatus also becomes simpler, which can improve the transmission efficiency of the vehicle transmission apparatus.

In some embodiments of this application, a plurality of intermediate gears are provided, which are all meshed between the input gear and the output gear.

According to some embodiments of this application, two intermediate gears are provided, and the two intermediate gears are symmetrically distributed on two sides of a line connecting the rotational centers of the output gear and the input gear.

According to some embodiments of this application, the rotational center of the input gear and rotational centers of the intermediate gears are on the same line.

According to some embodiments of this application, the vehicle transmission apparatus further includes a planetary gear mechanism in transmission connection with the output gear, where the planetary gear mechanism includes a sun gear, a planetary gear, a planetary carrier, and a ring gear, the planetary gear is disposed on the planetary carrier, the planetary carrier is meshed between the sun gear and the ring gear, the sun gear is connected to the output gear, the ring gear is fixed to a hub of a wheel, and the planetary carrier is fixed.

According to some embodiments of this application, the speed reducer includes a first housing, and the planetary carrier is fixed to the first housing.

According to some embodiments of this application, the planetary gear mechanism includes a second housing, the sun gear, the planetary gear, the planetary carrier, and the ring gear are disposed in the second housing, the ring gear is connected to the second housing, and the second housing is fixed to the hub.

According to some embodiments of this application, a circle of inner teeth are formed on an inner wall of the second housing, and the circle of inner teeth form the ring gear of the planetary gear mechanism.

According to some embodiments of this application, an output shaft is disposed between the sun gear and the output gear, and the output shaft is integrated with the sun gear.

According to some embodiments of this application, after passing through the input gear, the intermediate gear, the output gear, the sun gear, the planetary gear, and the ring gear sequentially, power of the motor is outputted to the hub of the wheel.

According to some embodiments of this application, the vehicle transmission apparatus further includes a planetary gear mechanism in transmission connection with the output shaft of the output gear, where the planetary gear mechanism includes a sun gear, a planetary gear, a planetary carrier, and a ring gear, the planetary gear is disposed on the planetary carrier, the planetary carrier is meshed between the sun gear and the ring gear, the sun gear is connected to the output shaft, the planetary carrier is fixed to the hub of the wheel, and the ring gear is fixed.

According to some embodiments of this application, the speed reducer includes a first housing, and the input shaft, the intermediate shaft, and the output shaft that are fixed in the first housing, the input gear is disposed on the input shaft, the intermediate gear is disposed on the intermediate shaft, the output gear is disposed on the output shaft, and the ring gear is fixed to the first housing.

According to some embodiments of this application, the planetary gear mechanism includes a second housing, the sun gear, the planetary gear, the planetary carrier, and the ring gear are disposed in the second housing, the planetary carrier is connected to the second housing, and the second housing is fixed to the hub.

According to some embodiments of this application, after passing through the input gear, the intermediate gear, the output gear, the sun gear, the planetary gear, and the planetary carrier sequentially, the power of the motor is outputted to the hub of the wheel.

According to some embodiments of this application, a radius of the output gear is greater than a radius of the input gear and radius of the intermediate gear.

A vehicle according to this application includes the foregoing vehicle transmission apparatus.

Other aspects and advantages of this application will be given in the following description, some of which will become apparent from the following description or may be learned from practices of this application.

DETAILED DESCRIPTION

Figure 1:
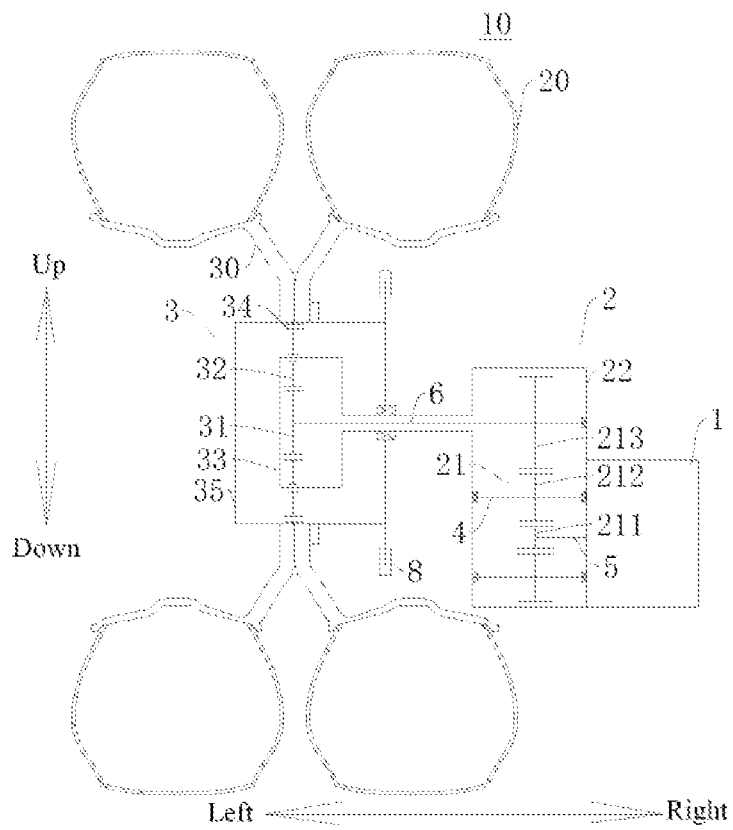
FIG. 1 is a principle diagram of a vehicle transmission apparatus according to an embodiment of this application.

Embodiments of this application are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary and used only for explaining this application, and should not be construed as a limitation on this application.

A vehicle transmission apparatus 10 according to an embodiment of this application is described below with reference to FIG. 1 to FIG. 4.

As shown in FIG. 1 to FIG. 4, the vehicle transmission apparatus 10 according to this embodiment of this application includes a motor 1 and a speed reducer 2. The speed reducer 2 may include a speed reduction gear set 21. The speed reduction gear set 21 may include an input gear 211, an intermediate gear 212, and an output gear 213 that are vertically arranged. The input gear 211 is connected to the motor 1. At least one intermediate gear 212 may be provided. That is, one or more intermediate gears 212 are disposed. In addition, the intermediate gear 212 is meshed between the input gear 211 and the output gear 213. Rotational centers of the input gear 211, the intermediate gear 212, and output gear 213 are not on the same line. For example, lines connecting the rotational centers of the input gear 211, the intermediate gear 212, and the output gear 213 may form an equilateral triangle, an isosceles triangle, or may another shape.

In the speed reducer 2, the input gear 211, the intermediate gear 212, and the output gear 213 are arranged in the same vertical direction, so that the structure of the vehicle transmission apparatus 10 becomes simpler, and the structure of the speed reducer 2 may become more compact in an axial direction. In addition, the width of the aisle of a vehicle is mainly related to an axial width of the speed reducer 2. The speed reducer 2 adopts first-stage gear transmission, which directly reduces the axial width of the first-stage gear mechanically. Therefore, a size of the speed reducer 2 can be reduced. This helps widen a drive axle housing, to maximize the width of the aisle in the vehicle, so that the aisle of the vehicle is widened. In addition, such gear meshing arrangement can disperse the torque of the input gear 211, and enhance the torque transmission capability of the speed reducer 2, thereby improving the transmission efficiency of the power.

Further, the structure of the speed reducer 2 can be further simplified through an external meshing structure of the input gear 211, the intermediate gear 212, and the output gear 213 in the speed reducer 2, to achieve higher machining accuracy. The input gear 211, the intermediate gear 212, and the output gear 213 of the speed reducer 2 have few meshing points, and the meshing points are symmetrical, to improve a load balancing effect, so that a bearing capacity of the vehicle transmission apparatus 10 can be improved. In addition, the few meshing points may also reduce energy loss, so that the transmission efficiency of the speed reducer 2 can be improved. Moreover, the few meshing points and the improvement of the machining accuracy can improve the noise, vibration, and harshness (NVH) performance.

Therefore, through the cooperation of the motor 1 and the speed reducer 2, the structure of the vehicle transmission apparatus 10 becomes more compact, which helps widen the aisle of the vehicle, and the structure of the vehicle transmission apparatus 10 also becomes simpler, which can improve the transmission efficiency of the vehicle transmission apparatus 10.

In some examples of this application, a plurality of intermediate gears 212 may be provided. In other words, two or more intermediate gears 212 may be provided, and the plurality of intermediate gears 212 are all meshed between the input gear 211 and the output gears 213. With such arrangement, the power can be split, to reduce load on gears and bearing parts, so that the load capacity of the vehicle transmission apparatus 10 can be further improved. In addition, the intermediate gears 212 can be better mounted between the input gear 211 and the output gear 213, to better pass power of the input gear 211 to the output gear 213, so that the transmission efficiency of the vehicle transmission apparatus 10 can be further improved.

Figure 2:
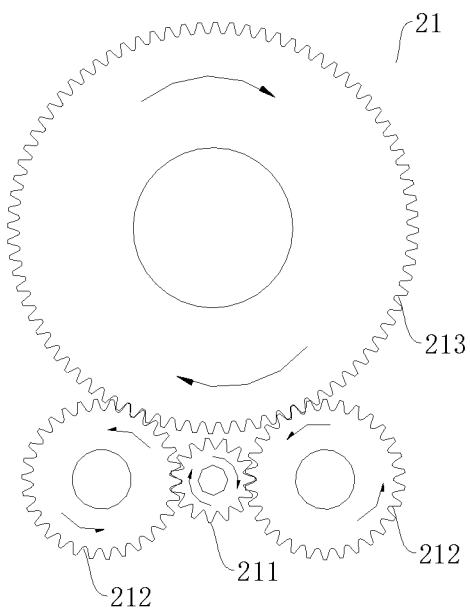
FIG. 2 is a schematic diagram of a speed reduction gear set of the vehicle transmission apparatus according to an embodiment of this application.

In some examples of this application, as shown in FIG. 1 and FIG. 2, two intermediate gears 212 may be provided. The two intermediate gears 212 are symmetrically distributed on two sides of a line connecting the rotational centers of the output gear 213 and the input gear 211. It should be noted that as shown in FIG. 2, the two intermediate gears 212 are symmetrically distributed on the left and right sides of the input gear 211. The intermediate gears 212 are meshed with the input gear 211. The output gear 213 is meshed with both of the two intermediate gears 212. Such arrangement makes the quantity of the disposed intermediate gears 212 more appropriate, to simplify the structure of the speed reducer 2. In addition, the two intermediate gears 212 are completely the same. Such arrangement can reduce types of the gears, thereby reducing the development costs.

In some examples of this application, the rotational centers of the input gear 211 and the intermediate gear 212 may be on the same line. Such arrangement can offset a radial force exerted on the input gear 211, thereby improving the operating efficiency of the speed reducer 2, and further improving the NVH performance of the vehicle.

Figure 3:
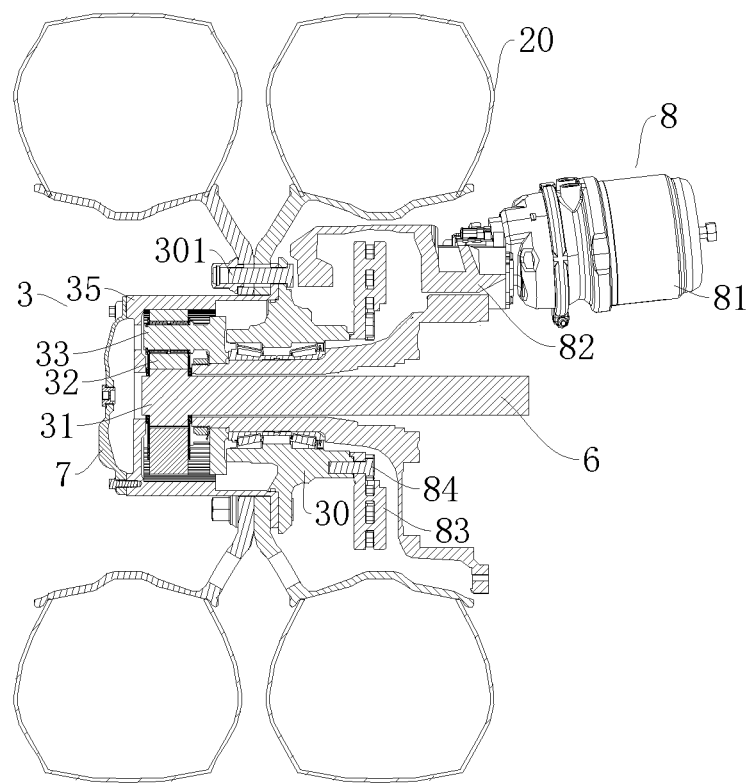
FIG. 3 is a cross-sectional view of a planetary gear mechanism, a wheel, and a hub of the vehicle transmission apparatus according to an embodiment of this application.
Figure 4:
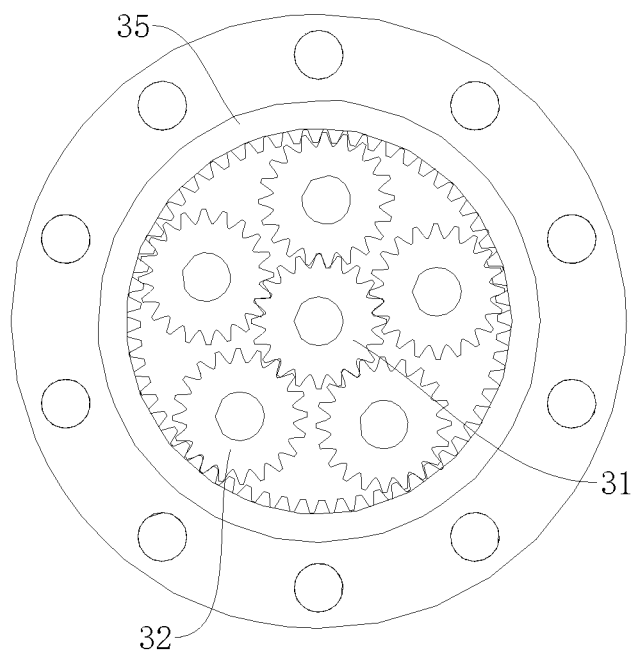
FIG. 4 is a schematic diagram of a planetary gear mechanism of the vehicle transmission apparatus according to an embodiment of this application.

In some examples of this application, as shown in FIG. 1, FIG. 3, and FIG. 4, the vehicle transmission apparatus 10 further includes a planetary gear mechanism 3 in transmission connection with the output gear 213. The planetary gear mechanism 3 may include a sun gear 31, a planetary gear 32, a planetary carrier 33 and a ring gear 34. The planetary gear 32 is disposed on the planetary carrier 33. The planetary gear 32 may hollowly sleeve the planetary carrier 33 by using a bearing, and the planetary gear 32 can rotate on its own. The planetary gear 32 is meshed between the sun gear 31 and the ring gear 34. The sun gear 31 is connected to the output gear 213. The ring gear 34 is fixed to a hub 30 of a wheel 20. The planetary carrier 33 is fixed.

When the vehicle transmission apparatus 10 operates, after the output gear 213 passes the power to the sun gear 31, the sun gear 31 drives the planetary gear 32 to rotate. During rotation, the planetary gear 32 drives the ring gear 34 to rotate, and then the ring gear 34 drives the hub 30 to rotate. Finally, the power is passed to the wheel 20. Such arrangement can achieve the purpose of passing the power to the wheel 20. In addition, compared with a speed reducer of the existing vehicle transmission apparatus, the speed reducer 2 of the vehicle transmission apparatus 10 in this application has a shorter axial distance and a better bearing capacity.

In some examples of this application, the speed reducer 2 may include a first housing 22. The planetary carrier 33 is fixed to the first housing 22. It should be noted that the planetary carrier 33 may be fixed to the first housing 22 by using a nut. After the planetary carrier 33 is fixed to the first housing 22, the planetary carrier 33 cannot rotate, where the nut provides good fastness. With such arrangement, the planetary carrier 33 can be firmly mounted on the first housing 22, so that the planetary carrier 33 can be prevented from coming off the first housing 22.

In some examples of this application, as shown in FIG. 1, FIG. 3, and FIG. 4, the planetary gear mechanism 3 may include a second housing 35. The sun gear 31, the planetary gear 32, the planetary carrier 33, and the ring gear 34 are disposed in the second housing 35. The second housing 35 can protect the sun gear 31, the planetary gear 32, the planetary carrier 33, and the ring gear 34, and can prevent the sun gear 31, the planetary gear 32, the planetary carrier 33, and the ring gear 34 from being damaged, thereby prolonging the service life of the sun gear 31, the planetary gear 32, the planetary carrier 33, and the ring gear 34.

In addition, the ring gear 34 is connected to the second housing 35. The second housing 35 is fixed to the hub 30. It should be noted that the second housing 35 may be connected to the hub 30 by using a bolt 301. An end cover 7 may be connected to the second housing 35 by using a bolt. With such arrangement, the second housing 35 and the hub 30 can be firmly mounted together, to prevent the second housing 35 from being separated from the hub 30, thereby ensuring the operating reliability of the vehicle transmission apparatus 10.

In some examples of this application, a circle of inner teeth may be formed on an inner wall of the second housing 35. The circle of inner teeth can form the ring gear 34 of the planetary gear mechanism 3. With such arrangement, the hub 30 and the ring gear 34, can be integrated, to make the structure of the speed reducer 2 simpler, thereby achieving higher transmission efficiency. In addition, such arrangement also makes the overall structure of the second housing 35 and the ring gear 34 more compact, thereby reducing a volume of the planetary gear mechanism 3, omitting a process of disposing the ring gear 34 independently, and reducing the quantity of parts of the planetary gear mechanism 3, so that the structure of the planetary gear mechanism 3 becomes simpler, and the structure of the vehicle transmission apparatus 10 is thus simplified.

In some examples of this application, as shown in FIG. 1 and FIG. 3, an output shaft 6 may be disposed between the sun gear 31 and the output gear 213. The output shaft 6 may be integrated with the sun gear 31. When the vehicle transmission apparatus 10 operates, the power of the speed reducer 2 may be passed to the sun gear 31 by using the output shaft 6. Such arrangement can improve the overall structure strength of the sun gear 31 and the output shaft 6, to prevent a connection between the sun gear 31 and the output shaft 6 from being broken, so that the sun gear 31 does not separate from the output shaft 6, thereby ensuring the sun gear 31 to rotate with the output shaft 6 at the same speed.

In some examples of this application, as shown in FIG. 1, after passing through the input gear 211, the intermediate gear 212, the output gear 213, the sun gear 31, the planetary gear 32, and the ring gear 34 sequentially, the power of the motor 1 may be outputted to the hub 30 of the wheel 20. Through double speed reduction and torque increasing implemented by the speed reducer 2 and the planetary gear mechanism 3, the power performance of the entire vehicle can be satisfied.

In some examples of this application, as shown in FIG. 1 and FIG. 3, the vehicle transmission apparatus 10 may further include a planetary gear mechanism 3 in transmission connection with the output shaft 6 of the output gear 213. The planetary gear mechanism 3 may include a sun gear 31, a planetary gear 32, a planetary carrier 33, and a ring gear 34. The planetary gear 32 may be disposed on the planetary carrier 33. The planetary gear 32 is meshed between the sun gear 31 and the ring gear 34. The sun gear 31 is connected to the output shaft 6. The planetary carrier 33 is fixed to the hub 30 of the wheel 20. The ring gear 34 is fixed. When the vehicle transmission apparatus 10 operates, the planetary carrier 33 drives the hub 30 to rotate, to finally pass the power to the wheel 20. Such arrangement can achieve the purpose of passing the power to the wheel 20.

In some examples of this application, as shown in FIG. 1 and FIG. 3, the speed reducer 2 may include the first housing 22, and an input shaft 5, an intermediate shaft 4, and the output shaft 6 that are fixed in the first housing 22. The input gear 211 may be disposed on the input shaft 5. The intermediate gear 212 may be disposed on the intermediate shaft 4. The output gear 213 may be disposed on the output shaft 6. The ring gear 34 is fixedly connected to the first housing 22.

The motor 1 is connected to the input shaft 5. The power is inputted through the input shaft 5. The input gear 211 may be rigidly connected to the input shaft 5. In addition, the input gear 211 may rotate with the input shaft 5 at the same speed. The intermediate shaft 4 may be fixed to the first housing 22 by using a bearing. The intermediate shaft 4 can rotate freely. The intermediate gear 212 may be rigidly connected to the intermediate shaft 4. The output gear 213 may be rigidly connected to the output shaft 6. With such arrangement, the input gear 211 can be firmly mounted on the input shaft 5, the intermediate gear 212 can be firmly mounted on the intermediate shaft 4, and the output gear 213 can be firmly mounted on the output shaft 6.

In some example of this application, as shown in FIG. 1 and FIG. 3, the planetary gear mechanism 3 may include the second housing 35. The sun gear 31, the planetary gear 32, the planetary carrier 33, and the ring gear 34 may be disposed in the second housing 35. The planetary carrier 33 is connected to the second housing 35. The second housing 35 is fixed to the hub 30. Because the planetary carrier 33 is connected to the second housing 35, the power is directly outputted to the hub 30 through the second housing 35.

In some example of this application, after passing through the input gear 211, the intermediate gear 212, the output gear 213, the sun gear 31, the planetary gear 32, and the planetary carrier 33 sequentially, the power of the motor 1 is outputted to the hub 30 of the wheel 20. Such arrangement can reduce loss of the power, to further improve the transmission efficiency of the power.

In some examples of this application, a radius of the output gear 213 is greater than a radius of the input gear 211 and a radius of the intermediate gear 212. Such arrangement can implement a speed reduction function of the speed reducer 2, and can enable the vehicle transmission apparatus 10 to meet operating requirements.

In some examples of this application, as shown in FIG. 1 and FIG. 3, the vehicle transmission apparatus 10 may further include a brake 8. The brake 8 may include a brake air chamber 81, a brake caliper 82, a brake disc 83, and a brake disc fixing bolt 84. The brake disc 83 may be connected to the hub 30 by using the brake disc fixing bolt 84. The brake air chamber 81 is connected to the brake caliper 82. The brake caliper 82 is fixed to the first housing 22.

The planetary gear mechanism 3 outputs a high speed reduction ratio: Z35/Z31, where Z35 is the quantity of teeth of the hub 30, and Z31 is the quantity of teeth of the sun gear 31, so as to satisfy power performance of the entire vehicle.

A vehicle according to the embodiments of this application includes the vehicle transmission apparatus 10 in the foregoing embodiments. The vehicle transmission apparatus 10 is disposed on the vehicle, so that the structure of the vehicle transmission apparatus 10 becomes more compact, which helps widen an aisle of the vehicle, and the structure of the vehicle transmission apparatus 10 also becomes simpler, which can improve the transmission efficiency of the vehicle.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of this application. In this specification, exemplary descriptions of the foregoing terms do not necessarily refer to a same embodiment or example. In addition, the described specific features, structures, materials, or features can be combined in a proper manner in any one or more embodiments or examples.

Although the embodiments of this application have been shown and described, a person skilled in the art can understand that the above embodiments cannot be construed to limit this application, and changes, alternatives, and modifications can be made in the embodiments without departing from the principle and the purpose of this application.

What is claimed is:

1. A vehicle transmission apparatus, comprising:
a motor; and
a speed reducer, wherein the speed reducer comprises a speed reduction gear set, the speed reduction gear set comprises an input gear, an intermediate gear, and an output gear, the input gear is connected to the motor, and the intermediate gear is meshed between the input gear and the output gear; and
rotational centers of the input gear, the intermediate gear, and the output gear are not on the same line;
wherein a radius of the output gear is greater than a radius of the intermediate gear, and the radius of the intermediate gear is greater than a radius of the input gear;
wherein the radius of the output gear is greater than a sum of the radius of the intermediate gear and the radius of the input gear;
wherein a rotational center of the output gear is disposed vertically above a rotational center of the input gear and a rotational center of the intermediate gear is disposed horizontally to the rotational center of the input gear.

2. The vehicle transmission apparatus according to claim 1, wherein the speed reducer comprises a plurality of intermediate gears, and the plurality of intermediate gears are all meshed between the input gear and the output gear.

3. The vehicle transmission apparatus according to claim 2, wherein the speed reducer comprises two intermediate gears, and wherein the two intermediate gears are symmetrically disposed on two sides of a line connecting the rotational centers of the output gear and the input gear, and wherein the radius of the output gear is greater than a sum of the radius of the input gear and each of the two intermediate gears.

4. The vehicle transmission apparatus according to claim 3, wherein the rotational center of the input gear and rotational centers of the intermediate gears are on the same line.

5. The vehicle transmission apparatus according to claim 4, further comprising a planetary gear mechanism, and wherein the planetary gear mechanism is in transmission connection with the output gear, wherein the planetary gear mechanism comprises: a sun gear, a planetary gear, a planetary carrier, and a ring gear, the planetary gear is disposed on the planetary carrier, the planetary gear is meshed between the sun gear and the ring gear, the sun gear is connected to the output gear, the ring gear is fixed to a hub of a wheel, and the planetary carrier is fixed.

6. The vehicle transmission apparatus according to claim 5, wherein the speed reducer comprises a first housing, and the planetary carrier is fixed to the first housing.

7. The vehicle transmission apparatus according to claim 5, wherein the planetary gear mechanism comprises a housing, wherein the sun gear, the planetary gear, the planetary carrier, and the ring gear are disposed in the housing, the ring gear is connected to the housing, and the housing is fixed to the hub.

8. The vehicle transmission apparatus according to claim 5, wherein the power of the motor is outputted to the hub of the wheel after passing through the input gear, the intermediate gear, the output gear, the sun gear, the planetary gear, and the ring gear sequentially.

9. The vehicle transmission apparatus according to claim 1, further comprising a planetary gear mechanism, and wherein the planetary gear mechanism is in transmission connection with the output gear, wherein the planetary gear mechanism comprises: a sun gear, a planetary gear, a planetary carrier, and a ring gear, the planetary gear is disposed on the planetary carrier, the planetary gear is meshed between the sun gear and the ring gear, the sun gear is connected to the output gear, the ring gear is fixed to a hub of a wheel, and the planetary carrier is fixed.

10. The vehicle transmission apparatus according to claim 9, wherein the speed reducer comprises a first housing, and the planetary carrier is fixed to the first housing.

11. The vehicle transmission apparatus according to claim 9, wherein the planetary gear mechanism comprises a housing, wherein the sun gear, the planetary gear, the planetary carrier, and the ring gear are disposed in the housing, the ring gear is connected to the housing, and the housing is fixed to the hub.

12. The vehicle transmission apparatus according to claim 11, wherein a circle of inner teeth is formed on an inner wall of the housing, and the circle of inner teeth forms the ring gear of the planetary gear mechanism.

13. The vehicle transmission apparatus according to claim 9, wherein an output shall is disposed between the sun gear and the output gear, and wherein the output shaft and the sun gear are formed as a single component.

14. The vehicle transmission apparatus according to claim 9, wherein the power of the motor is outputted to the huh of the wheel after passing through the input gear, the intermediate gear, the output gear, the sun gear, the planetary gear, and the ring gear sequentially.

15. The vehicle transmission apparatus according to claim 1, further comprising a planetary gear mechanism in transmission connection with an output shall of the output gear, wherein the planetary gear mechanism comprises a sun gear, a planetary gear, a planetary carrier, and a ring gear, the planetary gear is disposed on the planetary carrier, the planetary gear is meshed between the sun gear and the ring gear, the sun gear is connected to the output shall, the planetary carrier is fixed to a hub of the wheel, and the ring gear is fixed.

16. The vehicle transmission apparatus according to claim 15, wherein the speed reducer comprises a first housing, and wherein an input shaft, an intermediate shaft, and the output shaft are fixed in the first housing, the input gear is disposed on the input shaft, the intermediate gear is disposed on the intermediate shaft, the output gear is disposed on the output shaft, and the ring gear is fixed to the first housing.

17. The vehicle transmission apparatus according to claim 15, wherein the planetary gear mechanism comprises a housing, wherein the sun gear, the planetary gear, the planetary carrier, and the ring gear are disposed in the housing, the planetary carrier is connected to the housing, and the housing is fixed to the hub.

18. The vehicle transmission apparatus according to claim 15, wherein the power of the motor is outputted to the hub of the wheel after passing through the input gear, the intermediate gear, the output gear, the sun gear, the planetary gear, and the planetary carrier sequentially.

19. A vehicle, comprising the vehicle transmission apparatus according to claim 1.

20. A vehicle transmission apparatus, comprising:
a motor;
a speed reducer comprising a speed reduction gear set with an input gear connected to the motor, an output gear, and an intermediate gear meshed between the input gear and the output gear; and
a planetary gear mechanism in transmission connection with the output gear and comprising a sun gear, a planetary gear, a planetary carrier, a ring gear, and a housing;
wherein rotational centers of the input gear, the intermediate gear, and the output gear are not on the same line;
wherein a radius of the output gear is greater than a sum of a radius of the intermediate gear and a radius of the input gear;
wherein the planetary gear is disposed on the planetary carrier, the planetary gear is meshed between the sun gear and the ring gear, the sun gear is connected to the output gear, the ring gear is fixed to a hub of a wheel, and the planetary carrier is fixed;
wherein the sun gear, the planetary gear, the planetary carrier, and the ring gear are disposed in the housing, the ring gear is connected to the housing, and the housing is fixed to the hub; and
wherein a circle of inner teeth is formed on an inner wall of the housing, and the circle of inner teeth forms the ring gear of the planetary gear mechanism.

* * * * *